United States Patent [19]

Clausen

[11] Patent Number: 5,353,184

[45] Date of Patent: Oct. 4, 1994

[54] CASSETTE CLEANER HAVING BOTH CAPSTAN AND PINCH ROLLER ELEMENTS

[75] Inventor: Eivind Clausen, Bellingham, Wash.

[73] Assignee: Allsop, Inc., Bellingham, Wash.

[21] Appl. No.: 45,463

[22] Filed: Apr. 8, 1993

Related U.S. Application Data

[63] Continuation-in-part of Ser. No. 977,126, Nov. 16, 1992.

[51] Int. Cl.$^5$ .................. G11B 15/00; G11B 5/41
[52] U.S. Cl. ..................... 360/137; 360/128
[58] Field of Search .................. 360/137, 128

[56] References Cited

U.S. PATENT DOCUMENTS

| | | | |
|---|---|---|---|
| D. 276,607 | 12/1984 | Clausen et al. | D14/11 |
| D. 276,608 | 12/1984 | Clausen et al. | D14/11 |
| D. 277,168 | 1/1985 | Clausen et al. | D8/394 |
| 4,149,206 | 4/1979 | Loiselle | 360/128 |
| 4,225,893 | 9/1980 | Loiselle | 360/128 |
| 4,442,468 | 4/1984 | d'Alayer de Costemore d'Arc | 360/128 |
| 4,454,550 | 6/1984 | Clausen et al. | 360/137 |
| 4,454,551 | 6/1984 | Clausen et al. | 360/137 |
| 4,458,281 | 7/1984 | Kara | 360/128 |
| 4,761,700 | 8/1988 | Fritsch | 360/128 |
| 4,875,125 | 10/1989 | Joannou et al. | 360/128 |
| 4,918,577 | 4/1990 | Lee | 360/128 |
| 4,941,065 | 7/1990 | Fritsch | 360/128 |
| 5,021,912 | 6/1991 | Shao-Yung | 360/128 |

FOREIGN PATENT DOCUMENTS

| | | |
|---|---|---|
| 0309398 | 3/1989 | European Pat. Off. |
| 2239731 | 7/1991 | United Kingdom |

*Primary Examiner*—Robert S. Tupper
*Attorney, Agent, or Firm*—Christensen, O'Connor, Johnson & Kindness

[57] ABSTRACT

Device for cleaning a head assembly (12) of a magnetic tape player and/or recorder with a cleaning solution. The device includes a housing (14) adapted to be inserted in the player/recorder in a cleaning position, a drive mechanism (18) and wiper and (16) connected within the housing (14) for providing oscillating movement, and a cleaning head (20) connected to the wiper arm (16) for cleaning the head assembly (12). The cleaning head (20) comprises a rigid body (82) having a plurality of cleaning materials (84, 86, 88) extending forwardly out of the rigid body (82). One of the cleaning materials is a solution-holding material (84) characterized by its ability to absorb a cleaning solution, for spreading the cleaning solution on the head assembly (12). Another cleaning material (86, 88) comprising a relatively stiffer material for scrubbing the head assembly, is positioned on both sides of the solution-holding material (84). In use, the drive mechanism (18) within the housing is driven by the tape player and/or recorder such that it moves the wiper arm (16) with the attached cleaning head (20) back and forth along a transverse path on the head assembly (12) to be cleaned as it both spreads a cleaning solution and scrubs the area clean. The device also includes a cleaning cartridge (150) for cleaning the drive capstan and pinch roller of the associated player/recorder. The cleaning cartridge is provided with a first cleaning pad (154) for cleaning the pinch roller and a second cleaning pad (156) for cleaning the drive capstan. The cleaning cartridge pivots so that it does not blow the invention of the device into the player/recorder and to ensure the drive capstan and pinch roller are properly cleaned.

7 Claims, 6 Drawing Sheets

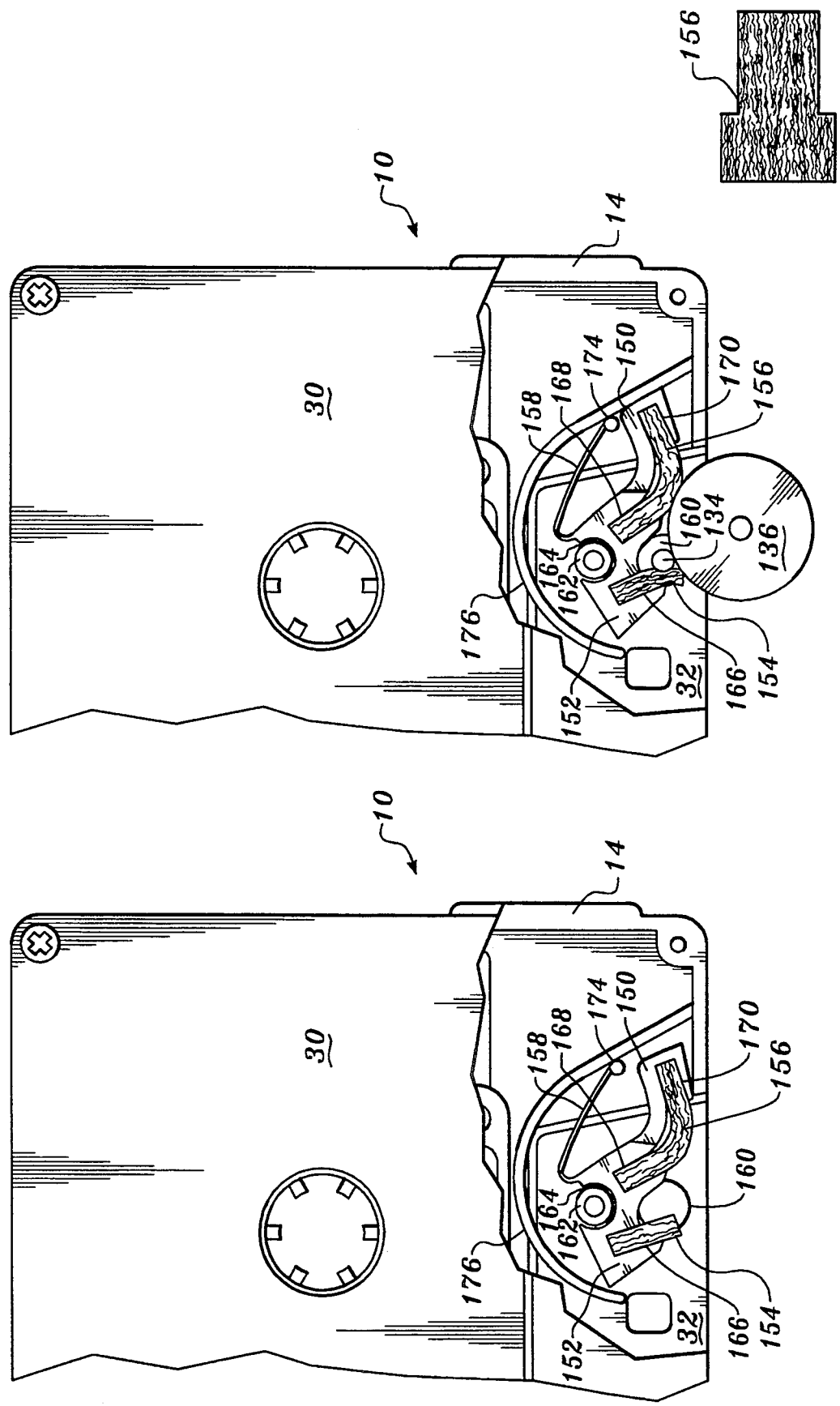

CASSETTE CLEANER HAVING BOTH CAPSTAN AND PINCH ROLLER ELEMENTS

RELATIONSHIP TO OTHER APPLICATIONS

This application is a continuation-in-part of application Ser. No. 07/977,126 filed Nov. 16, 1992.

FIELD OF THE INVENTION

This invention relates generally to a cleaning device for a playing head of a magnetic tape player and/or recorder unit and, more particularly, to an apparatus for spreading solution and wiping clean the guidance track and head member(s) of a cassette player and/or recorder unit.

BACKGROUND OF THE INVENTION

Particle build-up on head assemblies of magnetic tape players and/or recorder units has been a problem addressed in the past. As magnetic tape passes over a surface, magnetic particles from the tape and other debris may be deposited on the surface of the head. The particles build up, eventually degrading the signal produced by the head member. Typical approaches to cleaning such devices have involved using a cassette cleaning tape, with or without a cleaning solution, that runs over the head assembly to be cleaned, or using a cleaning cassette having an oscillating motion wiper arm and cleaning pad within its homing. The problem with these devices is their inability to penetrate and clean small crevices and corners so as to completely remove particulate matter from the entire area of the head assembly. This problem is particularly acute with a digital compact cassette (DCC) player and/or recorder where a guidance track is employed for accurate alignment of the tape as it passes over the head member. The guidance track and head member assembly has numerous spaced-apart corners and crevices. So far, it has proved difficult to clean these portions of the player and/or recorder head assemblies with conventional cleaning devices.

One well-known cleaning device is a cassette loaded with a short length of mildly abrasive cleaning tape that has a greater thickness than that of normal recording tape. This cleaning tape is sometimes used with a cleaning solution applied to the tape. It is used by inserting the cleaning tape within the cassette player and/or recorder unit, and activating the play mode such that the abrasive tape runs over the head member. This method does not clean inside small corners and crevices in which particulate matter builds up sufficiently to eventually become a problem.

Other prior art devices employ a wiper arm within a cassette-like housing. The wiper arm pivotally moves within the housing, causing a reciprocating motion of a pad at the end of the wiper arm to clean the head member. A cleaning solution may also be applied to the pad for improved cleaning ability. This device also has the problem of not being able to reach and clean in fight corners and crevices and, therefore, does not effectively address the problem of particulate matter build-up in those areas. The pad also is not especially effective in cleaning a DCC player and/or recorder unit, because it can easily hang up when cleaning around the guideposts and track.

In consideration of the limitations of the devices disclosed in the prior art discussed above, it seems apparent that an effective solution to the problem of cleaning the corners and crevices of a cassette player and/or recorder head assembly, especially a DCC guidance track and head unit, is not currently known. Accordingly, the present invention was developed, and it provides significant advantages over the prior art devices for cleaning magnetic tape players and/or recorder heads and the area or guidance track around them.

SUMMARY OF THE INVENTION

In accordance with this invention, apparatus for cleaning a head assembly of a magnetic tape player and/or recorder with a cleaning solution is provided that comprises a housing adapted to be inserted in a magnetic tape player and/or recorder in a cleaning position, a drive mechanism connected within the housing for causing a wiper arm to oscillate, and a cleaning head connected to the wiper arm for cleaning the head assembly. The cleaning head includes a section of absorbent material for holding and spreading a cleaning solution on the head assembly and scrubbing brushes, separate from the absorbent-material section, for scrubbing the head assembly. The scrubbing brushes are disposed on both sides of the absorbent material section so as to pass over the head assembly during oscillatory movement before and after the absorbent material section.

In accordance with a particular aspect of this invention, the scrubbing brushes are made up of bristles that are stiff relative to the absorbent material.

In accordance with another aspect of this invention, in one particular embodiment, the drive mechanism and wiper arm are designed to move the cleaning head over a path to cover the track and head member assembly of a DCC player and/or recorder.

In a preferred form, the absorbent material section comprises a felt pad, characterized by its ability to absorb a cleaning solution, for spreading cleaning solution in the general area to be cleaned. Both the scrubbing brushes and the felt pad are held by a rigid body next to each other, the felt pad being disposed between two sections of scrubbing material bristles.

In accordance with another aspect of this invention, at least one pivotable cartridge, having at least one capstan and pinch roller cleaning pad, is provided for cleaning the pinch rollers and capstans of magnetic tape players and/or recorders.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9A and 9B are top views of a portion of the invention, illustrating an alternative capstan and pinch roller cleaning cartridge; and FIG. 10 is a plan view of one of the cleaning pads employed in the capstan and pinch roller cleaning cartridge of FIGS. 9A and 9B.

DETAILED DESCRIPTION OF THE PREFERRED EMBODIMENT

Figure 1:
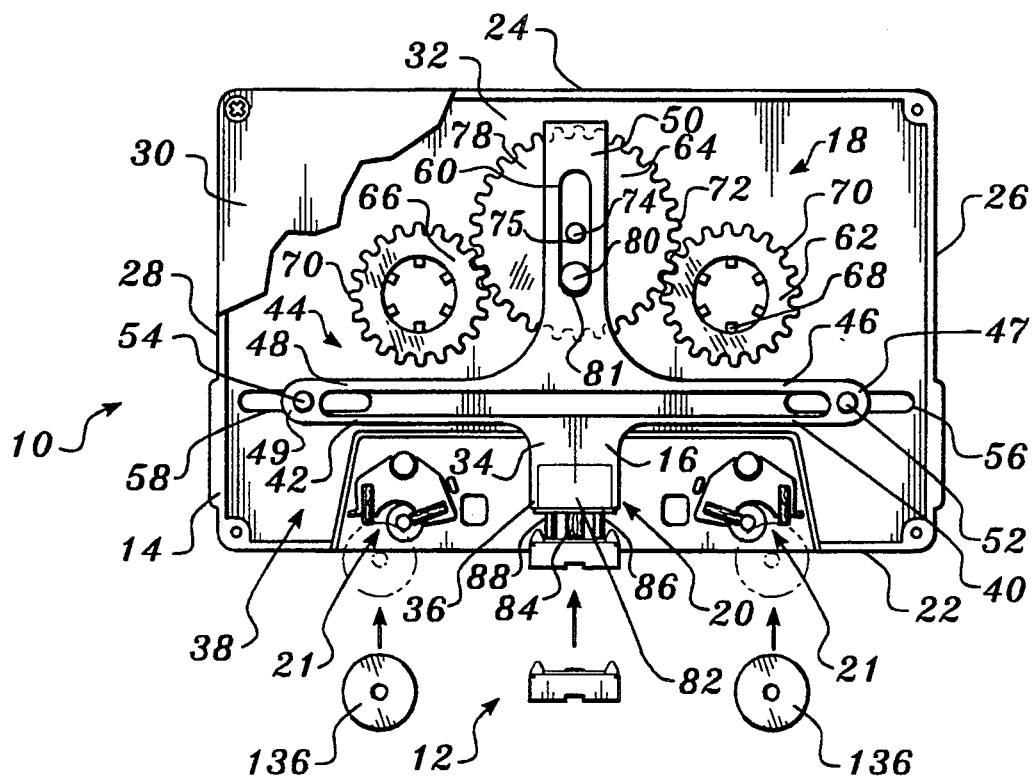
FIG. 1 is a top view of the invention, illustrating the internal workings of the cassette cleaning device in a position directly opposed to the head assembly to be cleaned.

A preferred embodiment of a cassette cleaning device 10 is illustrated in FIG. 1. Also illustrated in FIG. 1 is a head assembly 12 of a DCC player and/or recorder. Cassette cleaning device 10 includes a housing 14, a wiper arm 16, a drive mechanism 18, a cleaning head 20, and a pair of capstan and pinch roller cleaning cartridges 21.

Housing 14 is shown in FIG. 1 in a cleaning position opposite the phantom view of head assembly 12. A forward side 22 of housing 14 faces head assembly 12. Housing 14 is cassette-like in configuration and size, such that it will fit within a typical DCC player and/or recorder. This housing 14, in addition to forward end 22, has a rearward side 24, right and left sides 26 and 28, respectively, and top and bottom sides 30 and 32, respectively. For purposes of illustration, the top side of housing 14 has been partially cut away in FIG. 1.

Wiper arm 16 is slidably disposed within housing 14. Wiper arm 16 has a longitudinal axis that runs perpendicular to forward side 22 of housing 14. A forward end portion 34 of wiper arm 16 is disposed transversely at the center and longitudinally near forward side 22 of housing 14. Forward end portion 34 includes a box-shaped receiving portion 36 configured to receive and securely hold cleaning head 20. Receiving portion 36 opens in the direction of forward side 22. Thus, when cleaning head 20 is inserted within receiving portion 36 of forward end portion 34, it faces forward side 22 and head assembly 12. Receiving portion 36 is flexible enough to allow insertion and removal of cleaning head 20 and stiff enough to hold cleaning head 20 securely when the device is in use.

Wiper arm 16 includes a spring portion 38 which comprises right flexible member 40 and left flexible member 42. Right flexible member 40 extends from the rear of forward end portion 34 in a direction generally perpendicular to the longitudinal axis of wiper arm 16, toward right side 26 of housing 14. In a similar manner, left flexible member 42 extends from the rear of forward end portion 34, toward left side 28, in a direction generally perpendicular to the longitudinal axis of wiper arm 16.

The ends of right and left flexible members 40, 42 that are not connected to forward end portion 34 are connected to a mounting portion 44. Mounting portion 44 includes a right support member 46, a left support member 48, and a main support member 50. Right and left support members 46, 48 are connected to right and left flexible members 40, 42, respectively. Main support member 50 interconnects right and left support members 46, 48 near the center of cassette cleaning device 10. Right and left support members 46, 48 run generally parallel to right and left flexible members 40, 42. At far right and far left ends 47, 49 of support members 46, 48, right and left support member posts 52, 54 are located. Right and left support member posts 52, 54 extend below right and left support members 46, 48, respectively. Right and left transverse slots 56, 58 are formed in bottom side 32 of housing 14 to receive, in a slidable fashion, right and left support member posts 52, 54, respectively. Right and left transverse slots 56, 58, which are formed as an integral part of bottom side 32 of housing 14, comprise oblong-shaped, raised ridges running in a direction parallel to forward side 22 of housing 14. The length of transverse slots 56, 58 is sufficient to allow movement of cleaning head 20 back and forth over head assembly 12 as described below. Main support member 50 extends in a direction parallel to the longitudinal access of wiper arm 16 toward rearward side 24 of housing 14. Main support member 50 has a longitudinal slot 60 formed also parallel to the longitudinal access of wiper arm 16. Longitudinal slot 60 is also oblong in shape. The length of longitudinal slot 60 is substantially the same as that of transverse slots 56, 58.

Drive mechanism 18 comprises a drive wheel 62, a driven wheel 64 and a follower wheel 66 (when the magnetic tape player and/or recorder is running in a forward direction—when run in reverse direction, drive wheel 62 and follower wheel 66 exchange functions). Drive wheel 62 and follower wheel 66 are positioned to receive drive spindles of a magnetic tape player and/or recorder and have interior teeth 68 to operatively engage the spindles. Drive wheel 62 and follower wheel 66 also have exterior gear teeth 70. Driven wheel 64 has exterior driven teeth 72 that are the same size as exterior gear teeth 70. Driven wheel 64 is positioned between drive wheel 62 and follower wheel 66 such that exterior gear teeth 70 of drive wheel 62 and follower wheel 66 intermesh with exterior driven teeth 72 of driven wheel 64. Driven wheel 64 is transversely centered and longitudinally offset toward rearward side 24 within housing 14, such that its center is rearwardly offset from drive wheel 62 and follower wheel 66. A wheel mounting post 74 rotatably connects driven wheel 64 to bottom side 32 of housing 14. Wheel mounting post 74 extends from bottom side 32 of housing 14 to engage in a rotatable fashion with a center hole 75 formed in driven wheel 64. Wheel mounting post 74 extends only up through driven wheel 64 until almost flush with a top face 78 of driven wheel 64. A bottom face 76 (not shown) of driven wheel 64 lies flat against bottom side 32 of housing 14. A drive post 80, offset from a center of driven wheel 64, protrudes from top face 78 of driven wheel 64. Off-center positioning of drive post 80 is such that an outside edge 81 of drive post 80 is the same distance away from the center of driven wheel 64 as the distance that cleaning head 20 is to move relative to head assembly 12 during oscillating movement of the cleaning head, as described below. Drive post 80 is slidably engaged within longitudinal slot 60.

Cleaning head 20 includes rigid body 82, a centrally located spreading material 84, and right and left scrubbing materials 86, 88. Cleaning head 20 is removably attached to forward end portion 34 of wiper arm 16 by friction mounting rigid body 82 within receiving portion 36 of wiper arm 16. Spreading and scrubbing materials 84, 86, 88 are held within and protrude from rigid body 82 toward forward side 22 of housing 14. Cleaning head 20 may be removed from cassette cleaning device 10 by pulling rigid body 82 from receiving portion 36.

Figure 2:
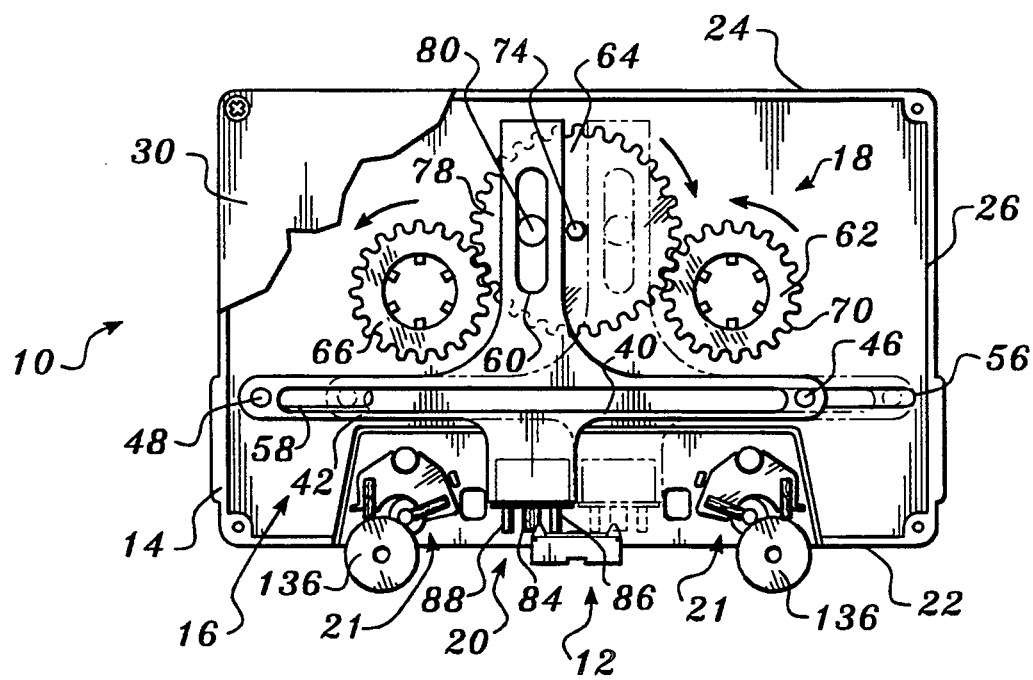
FIG. 2 is a top view of the invention, illustrating movement of the drive mechanism and wiper arm assembly in cleaning a head assembly.

FIG. 2 illustrates how movement of drive wheel 62 causes cleaning head 20 to move along a transverse path to clean head assembly 12. Because drive mechanism 18 includes follower wheel 66, cassette cleaning device 10 is symmetrical about a longitudinal axis extending from the middle of rearward side 24 to forward side 22. This symmetry allows cassette cleaning device 10 to be utilized with top side 30 facing either up or down. It should be understood that if cassette cleaning device 10 is used with top side 30 facing down, follower wheel 66 operatively engages with a driving spindle of the player and/or recorder to drive driven wheel 64 and so on. With top side 30 facing up, the drive spindle that is operatively engaged to drive wheel 62 turns drive wheel 62 in a counterclockwise direction, and gear teeth 70 cause the rotation of driven wheel 64 in a clockwise direction about wheel mounting post 74. Drive post 80, being connected to top face 78 of driven wheel 64, also rotates in a clockwise direction. Because drive post 80 is offset from the center of driven wheel 64, drive post 80 moves in a circular path around wheel mounting post 74. Since drive post 80 is slidably engaged within longitudinal slot 60, rotation of drive post 80 causes wiper arm 16 to move either left or right, depending on the location and direction of movement of drive post 80. Right and left support member posts 46, 48 are operatively engaged in right and left transfer slots 56, 58 respectively. Thus, wiper arm 16 only moves in a transverse direction, i.e., a direction perpendicular to the longitudinal access of wiper arm 16.

For the position and direction of rotation of drive post 80 shown in FIG. 2, wiper arm 16 is at its left-most position and is about to begin travel in a direction toward right side 26 of housing 14. The phantom view of wiper arm 16 in FIG. 2 illustrates the positioning at the right-most location of wiper arm 16. Thus, the extreme positions of cleaning head 20, which is attached to wiper arm 16, are also shown in FIG. 2. In those extreme positions, it is seen that spreading material 84 reaches the furthest extent of head assembly 12. In the extreme left position, right scrubbing material 86 does not quite reach the left-most portion of head assembly 12 and vice versa. This reach limitation is not detrimental, since the other of scrubbing materials 86 or 88 passes over the extreme portion of the head assembly, both before and after that portion is covered by spreading material 84.

As cleaning head 20 passes over head assembly 12, spreading material 84 and fight and left scrubbing materials 86, 88 deflect slightly because of contact with head assembly 12. Right and left flexible members 40, 42 also deflect slightly, relieving some pressure on cleaning head 20 so that spreading and scrubbing materials 84, 86, 88 do not become hung up on head assembly 12, causing the cassette player and/or recorder to stop. Providing force on cleaning head 20 so that scrubbing materials 86, 88 are pushed and slightly deflect against head assembly 12 enables scrubbing materials 86, 88 to reach into corners and crevices of head assembly 12 as they pass over head assembly 12. Still another advantage of the wiper arm 16 of this invention is that it can be selectively positioned inside housing 14 to accurately control the mount of pressure cleaning head 20 applies to the player and/or recorder head assembly 12. More specifically, the selective forward or rearward positioning of flexible members 40, 42 and the support posts 52, 54 and complementary mounting slots 56, 58 and the dimensioning of forward end portion 34 of wiper arm 16 can be used to increase or decrease the pressure the cleaning head 20 applies to the head assembly 12. Since the resiliency of flexible members 40, 42 does not significantly deteriorate over time, the mount of pressure cleaning head 20 applies to the head assembly 12 remains relatively constant over the lifetime of the cassette cleaning device 10.

Figure 3:
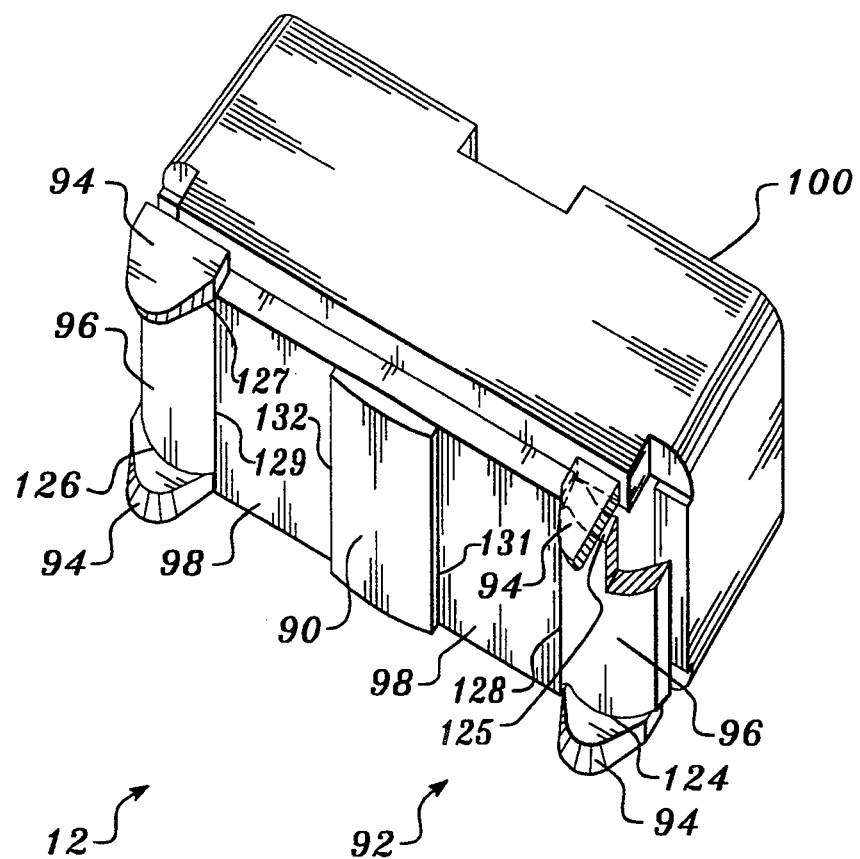
FIG. 3 is a perspective view of a DCC player and/or recorder head and guidance track arrangement.

FIG. 3 illustrates head assembly 12 of a digital cassette player and/or recorder. This type of head assembly poses significant problems for prior art cleaning cassettes because of the length of area to be cleaned, the corners and crevices involved, and the detrimental effect on sound quality of any particulate matter that remains on the head assembly. As shown in FIG. 3, head assembly 12 includes a read/write head 90, located centrally, and a tape guidance track 92 that accurately aligns a tape over read/write head 90. Tape guidance track 92 includes upper and lower tape guide posts 94, arched floor members 96, and fiat floor members 98. In playing or recording a magnetic tape passes over an area on head assembly 12 between tape guide posts 94 and over arched floor members 96, flat floor members 98, and read/write head 90. Head assembly mounting structure 100 secures tape guidance track 92 and interfaces with the rest of the DCC player and/or recorder.

The geometry of head assembly 12 shown in FIG. 3 reveals many challenges to performing a proper cleaning by use of a cassette cleaning device. Many corners, crevices and protrusions on the head assembly may interfere with the operation of the cassette cleaning device or may be hard for the cassette cleaner to access and clean. Crevices 124, 125, 126, 127 are defined between tape guide posts 94 and arched floor members 96. There are also small crevices 128, 129 between arched floor members 96 and flat floor members 98. Abrupt corners 131, 132 between flat floor members 98 and read/write head 90 can also present a place for particulate matter to accumulate. For example, in some DCC head assemblies the guide posts 94 may be spaced approximately four millimeters from the read/write head and the assembly may have an overall width of twelve millimeters. These are all places that the current cassette cleaning devices do not adequately clean. The cassette cleaning device 10 of the present invention has a distinct advantage over other devices in cleaning these problem areas. The present invention has the advantage of moving through a transverse cleaning path without causing a pendulum-like swing that would pull away at the ends of a track. Due to the broad width of the strictly translational movement by cleaning head 20 perpendicular to the longitudinal access of wiper arm 16, cassette cleaning device 10 is able to clean all of the above-mentioned problem areas along the entire width of the head assembly.

In the description below, the letters "a," "b," "c," and "d" will be used with the reference numerals for equivalent elements to distinguish between the different embodiments in which those elements appear.

Figure 4:
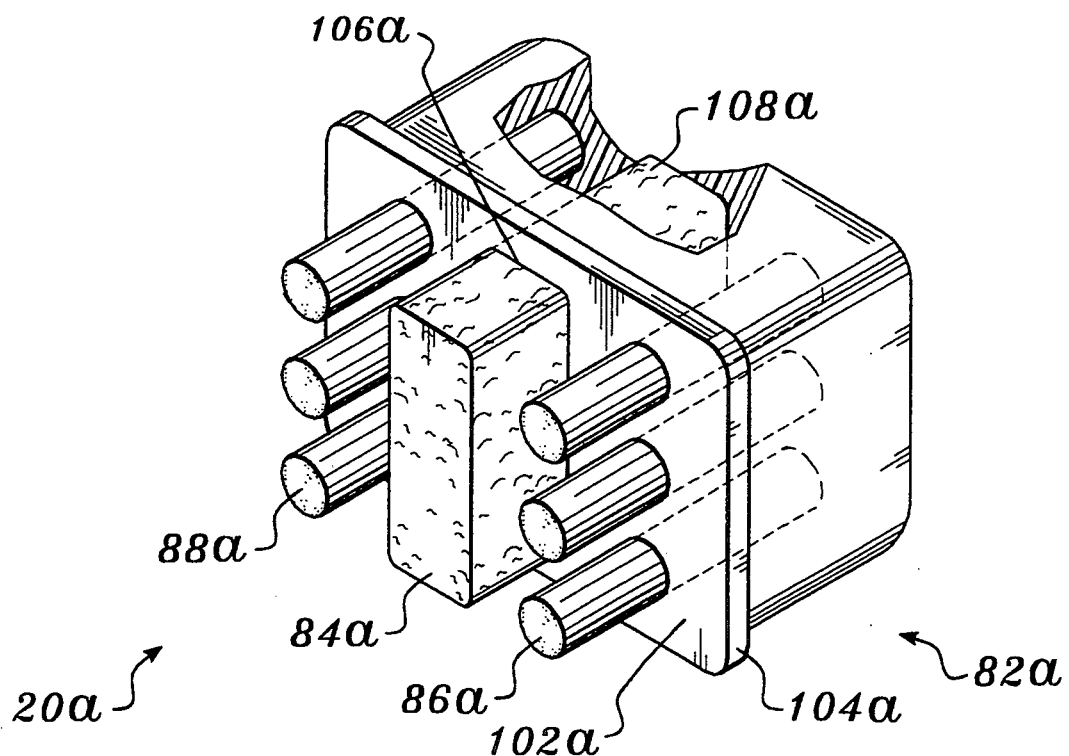
FIG. 4 is a perspective view of a preferred embodiment of a cleaning head of the present invention, illustrating a brush-pad-brush arrangement.

FIG. 4 illustrates a first preferred embodiment of a cleaning head 20a. Cleaning head 20a comprises a rigid body 82a, a pad 84a, right bristles 86a, and left bristles 88a. Rigid body 82a is box-shaped and molded of plastic. It includes a forward face 102a and a ridge 104a surrounding forward face 102a. Rigid body 82a is sized to be held within receiving portion 36 of wiper arm 16. Ridge 104a remains outside of receiving portion 36 so that forward face 102a is opposite forward side 22 of housing 14. Rigid body 82a also includes rigid body opening 106a shaped to accept pad 84a. Rigid body opening 106a is shaped to match a rearward pad portion 108a of pad 84a. Pad 84a comprises a felt-like material characterized by its ability to absorb a hydrocarbon cleaning solution and has a parallelepiped shape that protrudes from forward face 102a of rigid body 82a so as to contact head assembly 12 when cassette cleaning device 10 is in use. The width of pad 84a is sized to fit between tape guide posts 94 of head assembly 12. Right and left bristles 86a, 88a comprise filaments that are stiff relative to pad 84a. Right and left bristles 86a, 88a are formed in vertical columns of three on either side of pad 84a and are held within rigid body 82a by being molded with the plastic of rigid body 82a.

Cleaning head 20a has numerous advantages over prior art cleaning cassettes. Since left and right bristles 86a, 88a comprise relatively stiff, yet flexible filaments, they can deflect over high points, yet tend to reach within corners and crevices of head assembly 12. Pad 84a is wide enough to spread a cleaning solution on areas of tape guidance track 92 as needed, but not so wide as to hang up on tape guide posts 94. Pad 84a does not extend as far outwardly of forward face 102a as do bristles 86a, 88a, and thus does not catch on any abrupt corners; however, the pad still spreads enough cleaning solution for proper scrubbing with bristles 86a, 88a. Right and left bristles 86a, 88a spread the cleaning solution laid down by pad 84a, into the corners and crevices and clean particulate matter from these places. To accomplish this task, bristles 86a, 88a are slightly longer and stiffer than pad 84a, as discussed above.

Figure 5:
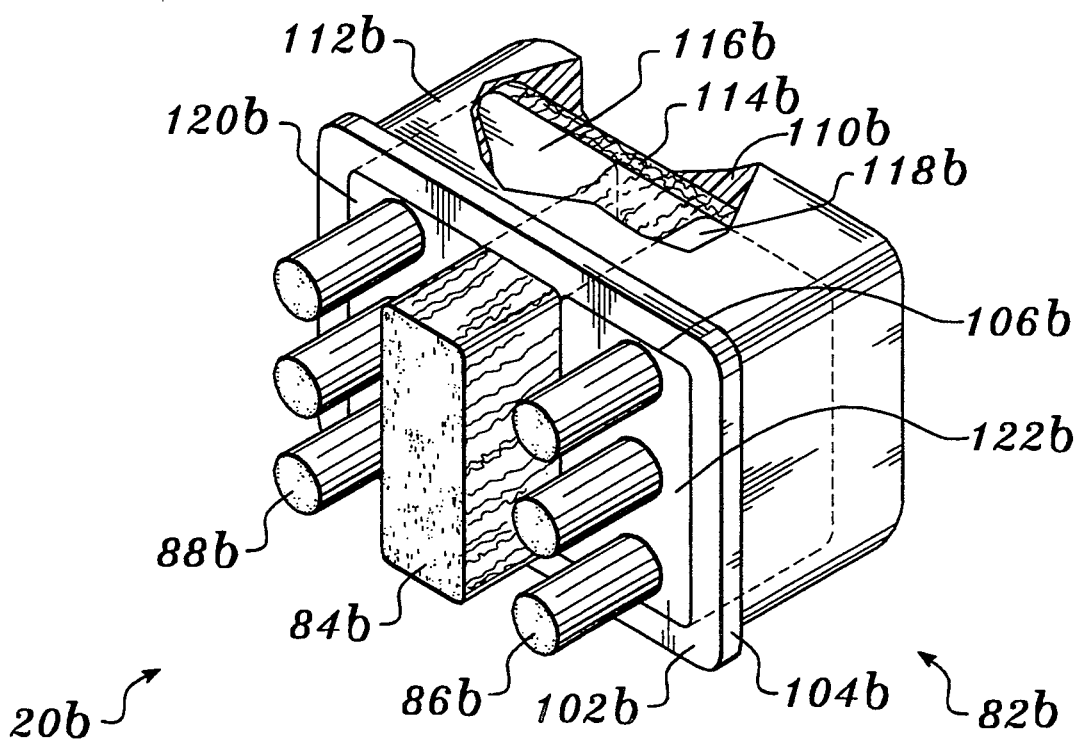
FIG. 5 is a perspective view of an alternate embodiment of a cleaning head of the present invention, illustrating a bristle-carpet tuft-bristle arrangement.

An alternate embodiment of a cleaning head 20b is shown in FIG. 5. The embodiment shown in FIG. 5 is similar to that described above and illustrated in FIG. 4, except in those aspects described below. Cleaning head 20b comprises a rigid body 82b, a carpet-tuft material 84b, and scrubbing bristles 86b, 88b. In this embodiment, rigid body 82b is made of molded plastic that forms a four-sided cavity having walls 112b and a floor 110b. As in the previous embodiment, cleaning head 20b also includes a ridge 104b and a forward face 102b. A rigid-body opening 106b accepts a carpet-tuft substrate 114b, and left and right bristle holders 116b, 118b. Carpet tuft substrate 114b is secured to floor 110b in the cavity of rigid body 82b. Carpet-tuft material 84b extends from carpet-tuft substrate 114b at a middle portion of rigid body 82b. Left and right bristle holders 116b, 118b are secured within rigid body walls 112b on the outside of carpet-tuft material 84b. Left and right bristle holders 116b, 118b are formed from molded plastic with scrubbing bristles 86b, 88b held within them. Left and right bristle holders 116b, 118b are inserted within walls 112b, with their ends bottoming against carpet-tuft substrate 114b, which covers entire floor 110b. In this arrangement, left and right bristle holders 116b, 118b have left and right bristle holder faces 120b, 122b that are flush with forward face 102b.

The functioning of this alternate embodiment of the cleaning head is similar to that of the embodiment illustrated in FIG. 4, as described above. However, carpet-tuft material 84b is more like the scrubbing bristles 88b, in that it bends and conforms to corners and crevices. Thus, the distance carpet-tuft material 84b protrudes from forward face 102b is about equal to that of scrubbing bristles 86b, 88b.

Figure 6:
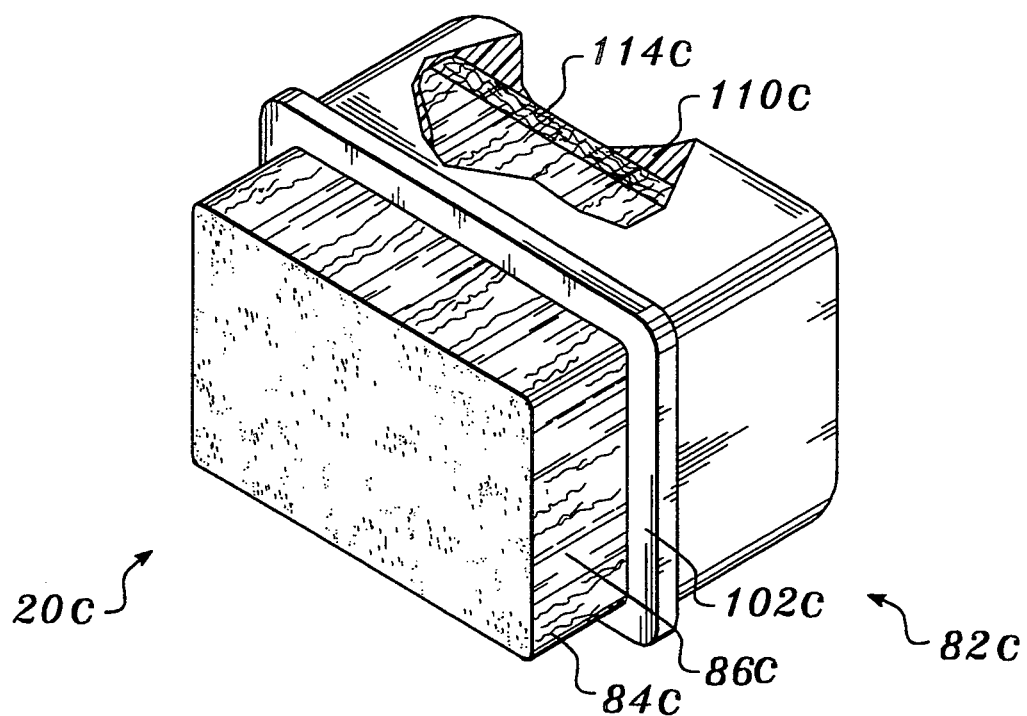
FIG. 6 is a perspective view of another alternate embodiment of a cleaning head of the invention, illustrating an interspersed bristle arrangement.

Another alternate embodiment of a cleaning head 20c is illustrated in FIG. 6. A rigid body 82c is formed that is the same as that described above in relation to FIG. 5. The principal difference between this embodiment and the others is that the present embodiment includes wicking filaments 84c, which are interspersed with scrubbing filaments 86c, and all filaments 84c, 86c are connected to a filament substrate 114c. Filaments 84c, 86c are interspersed and run wall-to-wall within rigid body 82c. Filament substrate 114c is glued to a floor 110c. The length of filaments 84c, 86c are such that they protrude from a forward face 102c of rigid body 82c sufficiently to contact head assembly 12 when in use.

Figure 7:
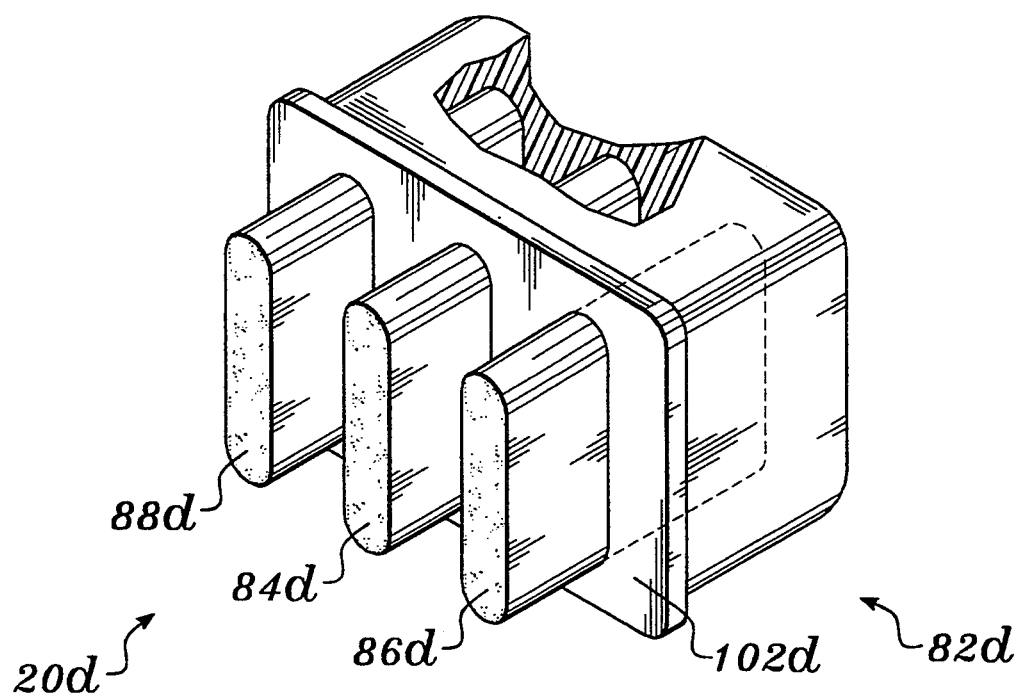
FIG. 7 is a perspective view of another alternate embodiment of a cleaning head of the invention, illustrating a stiff-soft-stiff bristle arrangement.

Mother alternate embodiment of a cleaning head 20d is illustrated in FIG. 7. In this embodiment, a rigid body 82d is molded integrally with scrubbing bristles 86d, 88d, and absorbent bristles 84d. Absorbent bristles 84d are characterized by their ability to wick a cleaning solution for application to head assembly 12. Scrubbing bristles 86d, 88d are stiff relative to absorbent bristles 84d and are for scrubbing head assembly 12 free of any particulate matter. Scrubbing bristles 86d, 88d and absorbent bristles 84d are aligned in vertical columns that span an area to be cleaned on head assembly 12. As in previously described embodiments, these scrubbing bristles 86d, 88d and absorbent bristles 84d protrude from a forward face 102d of rigid body 82d such that they contact head assembly 12 when cassette cleaning device 10 is used.

All of the above-described cleaning head embodiments 20a–d share several important advantages. They spread a cleaning solution over all areas of tape guidance track 92 that should be cleaned. While doing so, they also scrub any foreign matter from the corners and crevices with the bristles comprising scrubbing material 86a–d. The embodiments also share the advantages of spreading materials 84a–d, which are characterized by their ability to absorb a hydrocarbon cleaning solution. Thus, the softer, more absorbent material is used for spreading the solution, and a stiffer, more penetrating material is used for scrubbing, thereby benefiting from the advantages of both types of materials. Oscillating mechanism 18 of the invention also provides the advantage of back and forth movement without cleaning head 20a–d losing contact with the area to be cleaned. Also, because scrubbing bristles 86a–d, 88a–d are filaments, they do not hang up on any protrusions or corners while cleaning head assembly 12. Still another advantage of this invention is that the stiffer bristles 86 scrub the crevices 124–127 adjacent the guide posts 94, especially the bottom-located crevices 124 and 126, so that dirt does does not accumulate. This ensures that the bottom of the tape that passes over the guide track 92 properly seats at the bases of the bottom located guide posts 94 so that the tape is properly positioned over the read/write head 90.

Figure 8:
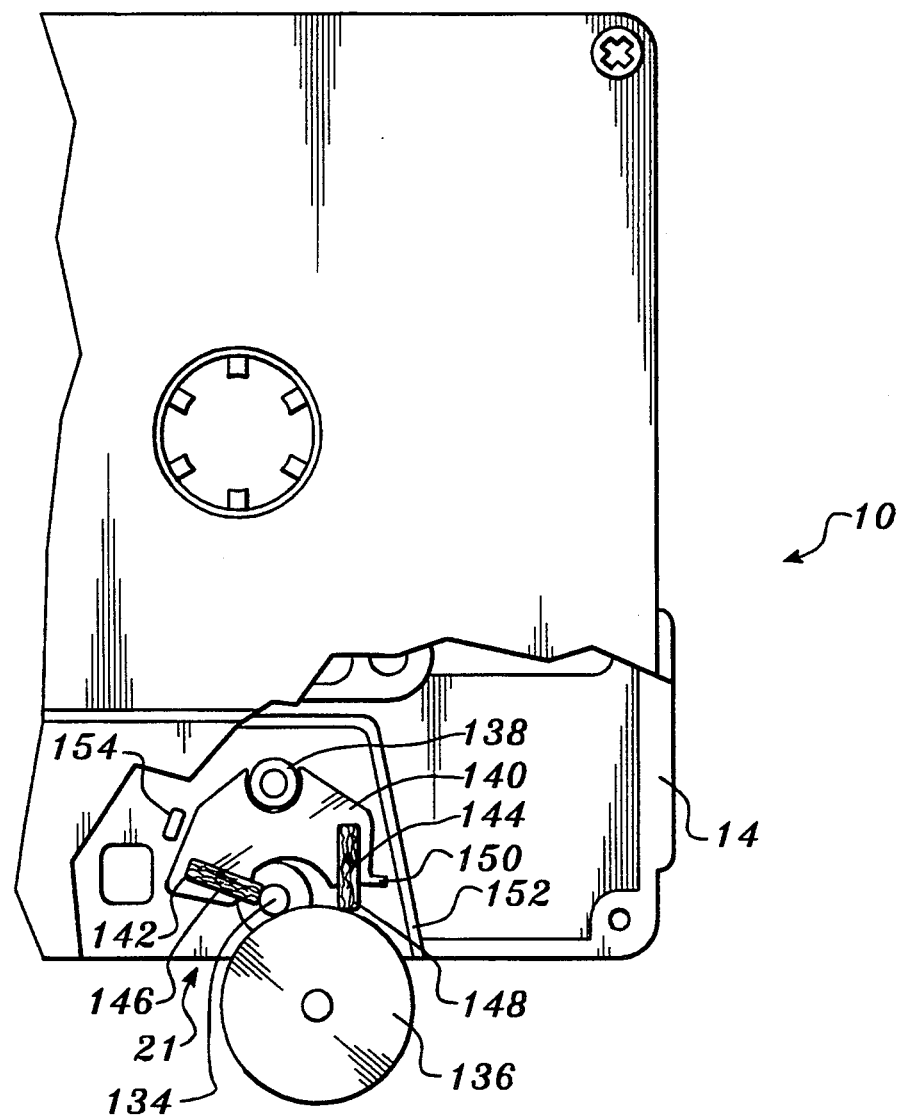
FIG. 8 is a top view of a portion of the invention, illustrating the capstan and pinch roller cleaning cartridge.

FIG. 8 illustrates a preferred embodiment of cleaning cartridge 21. It should be understood that a mirror image of this cartridge 21 is disposed within housing 14 on the opposite side of cleaning head 20 as illustrated in FIGS. 1 and 2. Cartridge 21 is employed within cassette cleaning device 10 to clean a capstan 134 and a pinch roller 136 of a cassette player and/or recorder. Cartridge 21 is pivotally attached to homing 14 about a pivot post 138. Pivot post 138 is formed as part of housing 14 and preferably extends from bottom side 32 of housing 14. Alternatively, pivot post 138 is made up of shorter posts extending from both bottom side 32 and top side 30 opposite each other. Cartridge 21 includes a post receiving portion 140 that is shaped as a portion of a cylinder to snap over pivot post 138. Cartridge 21 also includes a capstan pad receiving portion 142 and a pinch roller pad receiving portion 144. Capstan pad 146 is held within capstan pad receiving portion 142. Pinch roller pad 148 is held within pinch roller pad receiving portion 144.

Cartridge 21 has an overall shape in the form of the letter "C" with pinch roller pad 148 at one end and capstan pad 146 at the other end. Post receiving portion 140 is disposed at the back side of the C-shaped cartridge 21 and pivots about pivot post 138 such that pressure on pinch roller pad 148 from pinch roller 136 causes see-saw motion such that pressure is applied between capstan pad 146 and capstan 134 and vice versa.

Cartridge foot 143 is disposed on an outside end of pinch roller pad receiving portion 144. Cartridge foot 143 provides a contact point to stop excessive rotation of cartridge 21 in a counterclockwise direction (clockwise for cartridge 21 disposed on the other side of cassette cleaning device 10) when not placed within a cassette player and/or recorder. If, for example, cartridge 21 were to rotate counterclockwise, it would eventually contact a ridge 152 of housing 14. Cartridge foot 143 also provides a convenient tab against which a tool may by inserted to pry and pop cartridge 21 off pivot post 138 for replacement of pads 146, 148 or entire cartridge 21. A stop member 145 is also disposed behind cartridge 21 on the opposite side to limit rotation in a clockwise direction (counterclockwise for cartridge 21 disposed on the other side of cassette cleaning device 10). Stop member 145 is preferably an integral part of housing 14. Other means could be used to limit rotation of cartridge 21, such as a vane extension on a rearward facing side of pivot post 138 that would contact post receiving portion 140 to check excessive rotation in either direction.

The advantage of limited rotation of cartridge 21 is that it prevents the cartridge from rotating into the pathway of capstan 134 which can then block insertion of cassette cleaning device 10 into the player and/or recorder.

Prior to the cassette cleaning device 10 being inserted in the player and/or recorder, pads 146 and 148 are impregnated with a cleaning solution. When cassette cleaning device 10 is inserted in the player and/or recorder, and the player and/or recorder is actuated, pinch roller 136 moves against capstan 134. This causes pinch roller 136 to abut against pad 144 and pivot cartridge 21. The movement of cartridge 21, in turn, forces pad 146 against capstan 134. Consequently, as capstan 134 and pinch roller 136 rotate, they are cleaned by the solution on pads 146 and 144, respectively.

FIGS. 9A and 9B illustrate an alternative capstan and pinch roller cleaning cartridge 150. Cleaning cartridge 150 includes a body 152 to which two felt cleaning pads 154 and 156 are secured. A spring arm 158 attached to the cartridge body 152 biases the cleaning cartridge 150 so that, when it is in the static state, cleaning pad 154 is disposed away from the opening 160 in the device housing 14 through which the drive capstan 134 extends into the device 10.

The cleaning cartridge 150 is pivotally secured inside the cleaning device 10. Specifically, the cartridge body 152 is pivotally secured to two relatively short pins 162 that extend inward from the top and bottom sides 30 and 32, respectively, of the device housing 14. (FIGS. 9A and 9B only illustrate the pin 162 that extends upward from the inside surface of the bottom side 32 of the device housing). The cartridge body 152 is formed with a C-shaped slot 164 that allows the body to be snap-fitted over the pins 162.

Cartridge body 152 is further formed with a set of rectangular slots 166, 168, and 170 in which the cleaning pads 145 and 156 are seated. Cleaning pad 154 is located in slot 166, which is located on the side of the cartridge body 152 adjacent the center of the cleaning device 10. Cleaning pad 154 has a generally rectangular profile and is seated in the slot 166 so that one end of the pad extends away from the cartridge body 152. The opposed ends of cleaning pad 156 are seated in slots 168 and 170. Specifically, slot 168 is formed in the cartridge body 152 adjacent slot 164. Slot 170 is formed in the distal end of the cartridge body 152 adjacent the side edge of the cleaning device 10. Cleaning pad 156, as depicted in FIG. 10, has a T-shaped profile such that it has a relatively wide section, the end of which is fitted in slot 168, and a relatively narrow section, the end of which is fitted to slot 170. The portion of cleaning pad 156 between the end sections is located adjacent the outer surface of the cartridge body 152. Since the adjacent portion of the cartridge body 152 is formed with a curved surface, the abutting section of cleaning pad 156 curves around the outside of the cartridge body.

The spring arm 158 is integrally attached to the cartridge body 152 adjacent the portion of the body that defines the C-shaped slot 164. The spring arm 158 has a generally J-shaped structure that curves away from the portion of the cassette body 152 that defines slot 164 and toward the portion of the body that defines slot 170. A vertically oriented bar 174 is attached to the distal end of the spring arm 158. The outer ends of the spring arm bar 174 abut raised ridges 176 formed on the inside surfaces of the top and bottom sides 30 and 32 of the device housing 14, one ridge shown. The ridges 176 have a generally linear shape adjacent the side of the device housing 14 and a curved profile adjacent the mounting posts 162.

When the cleaning device 10 is in its normal state, outside of the tape player/recorder in which it is used, the spring arm 158 biases the cartridge body 152 so that the cleaning device is rotated around the pins 162 toward the center of the cleaning device, clockwise in FIG. 9A. This rotation of the cleaning cartridge 150 displaces cleaning pad 154 so that it is located away from the center of the drive capstan opening 160, to the left of the center of the opening 160 in FIG. 9A. When the cleaning device 10 is placed in the associated tape player/recorder and the player/recorder is actuated, the pinch roller 136 moves inward toward the cleaning cartridge 150. The pinch roller 136 then abuts the exposed surface of cleaning pad 156 to, in turn, cause the cleaning cartridge 150 to rotate counterclockwise around the pins 162 as depicted in FIG. 9B. The rotation of the cleaning cartridge 150 displaces cleaning pad 154 so that the pad is disposed against the drive capstan 134.

An advantage of the cleaning cartridge 150 of this invention is that the spring arm 158 normally biases cleaning pad 145 away from the drive capstan opening 160 formed in the device housing 14. This prevents the player/recorder's drive capstan 134 from displacing the cleaning pad 145 when the cleaning device 10 is inserted in the player/recorder. Moreover, the pivoting of the cleaning cartridge 150, upon the actuation of the player/recorder, causes the cleaning pad 154 to abut against the drive capstan 134 to ensure that the capstan is properly cleaned. Still another feature of the cleaning cartridge 150 of this invention is that the cartridge is snap fitted around the posts 162 inside the device housing 14. This makes it possible to replace the cartridge 150 installed in the device 10 in order to periodically provide the device with new cleaning pads 145 and 156.

While the preferred embodiment of the invention has been illustrated and described, along with several alternative embodiments, it will be appreciated that various other changes can be made therein without departing from the spirit and scope of the invention. For example, while the cleaning head 20 has been described as having a pad capable of holding a cleaning solution and a set of bristles that have scrubbing capabilities, in alternative embodiments of the invention, the cleaning head may have only one set of bristles for dry scrubbing the recorder head assembly. In other versions of the invention, it may be desirable to provide the cleaning head with three or more different types of bristles and cleaning pads. Still other versions of the invention may be provided where there is only a single support member post-guide slot assembly for controlling the motion of the wiper arm. Therefore, it is the object of the appended claims to cover all such modifications and variations within the true spirit and scope of the invention.

The embodiments of the invention in which an exclusive property or privilege is claimed are defined as follows:

1. Apparatus for cleaning a pinch roller and capstan of a magnetic tape player/recorder comprising:
   a housing adapted to be inserted in the tape player/recorder in a cleaning position, said housing defining an opening for receiving the drive capstan of the player/recorder; and
   a cleaning cartridge including: a cartridge body pivotally mounted in said housing adjacent said drive capstan opening; a first cleaning pad secured to said cartridge body and positioned to abut the drive capstan of the player/recorder when the drive capstan is disposed in said drive capstan opening of said housing; a second cleaning pad secured to said cartridge body and positioned to abut the pinch roller such that contact of the pinch roller against said second cleaning pad moves said first cleaning pad into contact with the capstan; and a biasing member coupled to said cartridge body, said biasing member positioned to contact said housing to pivot said cartridge body so that said first cleaning pad is normally located away from the center of said housing drive capstan opening.

2. The cleaning assembly of claim 1, wherein said cleaning cartridge biasing member is a spring arm integrally attached to said cartridge body.

3. The cleaning assembly of claim 1, wherein said cartridge body is releasably, pivotally secured to said housing.

4. The cleaning assembly of claim 1, wherein said housing is provided with at least one mounting pin and said cartridge body is releasably secured to said at least one mounting pin.

5. The cleaning assembly of claim 1, wherein said cartridge body is formed with a first slot and said first cleaning pad is partially seated in said first cartridge body slot.

6. The cleaning assembly of claim 5, wherein said cartridge body is formed with second and third slots, a first end of said second cleaning pad is partially secured in said second cartridge body slot, a second end of said second cleaning pad is secured in said third cartridge body slot, and said cartridge body is shaped so that an exposed portion of said second cleaning pad between said ends of said cleaning pad abuts the pinch roller of the tape player/recorder.

7. The cleaning assembly of claim 6 wherein said housing is provided with at least one mounting pin and said cartridge body is releasably secured to said at least one mounting pin.

* * * * *